(12) United States Patent
Gray

(10) Patent No.: US 10,788,989 B2
(45) Date of Patent: *Sep. 29, 2020

(54) NON-UNIFORM MEMORY ACCESS (NUMA) RESOURCE ASSIGNMENT AND RE-EVALUATION

(71) Applicant: Red Hat, Inc., Raleigh, NC (US)

(72) Inventor: William Samuel Gray, Milford, NH (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,092

(22) Filed: Jul. 6, 2018

(65) Prior Publication Data

US 2018/0314425 A1    Nov. 1, 2018

Related U.S. Application Data

(63) Continuation of application No. 14/178,810, filed on Feb. 12, 2014, now Pat. No. 10,019,167.

(60) Provisional application No. 61/766,803, filed on Feb. 20, 2013.

(51) Int. Cl.
*G06F 17/30* (2006.01)
*G06F 3/06* (2006.01)
*G06F 9/50* (2006.01)

(52) U.S. Cl.
CPC .............. *G06F 3/061* (2013.01); *G06F 3/067* (2013.01); *G06F 3/0644* (2013.01); *G06F 9/5016* (2013.01); *G06F 9/5027* (2013.01); *G06F 2209/503* (2013.01)

(58) Field of Classification Search
CPC .... G06F 9/5016; G06F 9/4856; G06F 9/5011; G06F 9/45537; G06F 9/5083
See application file for complete search history.

(56) References Cited

U.S. PATENT DOCUMENTS

| 8,069,218 | B1 * | 11/2011 | Tormasov | G06F 9/4856 |
| | | | | 709/212 |
| 2003/0088608 | A1 * | 5/2003 | McDonald | G06F 9/4881 |
| | | | | 718/106 |
| 2005/0120160 | A1 * | 6/2005 | Plouffe | G06F 9/45537 |
| | | | | 711/1 |
| 2006/0206489 | A1 * | 9/2006 | Finnie | G06F 9/5016 |
| 2008/0034370 | A1 * | 2/2008 | Huizenga | G06F 9/5011 |
| | | | | 718/104 |

(Continued)

*Primary Examiner* — Ryan Bertram
*Assistant Examiner* — Trang K Ta
(74) *Attorney, Agent, or Firm* — Womble Bond Dickinson (US) LLP

(57) ABSTRACT

A system and a method are disclosed for providing for non-uniform memory access (NUMA) resource assignment and re-evaluation. In one example, the method includes receiving, by a processing device, a request to launch a first process in a system having a plurality of Non-Uniform Memory Access (NUMA) nodes, determining, by the processing device, a resource requirement of the first process, determining, based on resources available on the plurality of NUMA nodes, a preferred NUMA node of the plurality of NUMA nodes to execute the first process, the preferred NUMA node being determined by the processing device without user input, and binding, by the processing device, the first process to the preferred NUMA node.

11 Claims, 7 Drawing Sheets

(56) References Cited

U.S. PATENT DOCUMENTS

2009/0031066 A1* 1/2009 Bansal ............... G06F 9/5011
710/113
2010/0325637 A1* 12/2010 Radmilac ............ G06F 9/5083
718/104

* cited by examiner

US 10,788,989 B2

NON-UNIFORM MEMORY ACCESS (NUMA) RESOURCE ASSIGNMENT AND RE-EVALUATION

RELATED APPLICATIONS

The present application claims the benefit of U.S. patent application Ser. No. 14/178,810, titled "Non-Uniform Memory Access (NUMA) Resource Assignment for Re-Evaluation," which claims the benefit of U.S. Provisional Patent Application Ser. No. 61/766,803, titled "Method and System For Providing a Non-Uniform Memory Access Daemon (NUMAD) for Automatic NUMA Binding," filed on Feb. 20, 2013, the entire contents of which are herein incorporated by reference.

TECHNICAL FIELD

The present disclosure relates to Non-Uniform Memory Access (NUMA) binding, and more specifically to a method and system for NUMA resource assignment and re-evaluation.

BACKGROUND

Modern computer servers may typically have a Non-Uniform Memory Access (NUMA) architecture that locates various subsets of system memory near subsets of the system CPU cores. NUMA is a computer memory design used in multiprocessor systems, where the memory access time depends on the memory location relative to the processor. Under NUMA, a processor can access its own local memory faster than non-local memory, that is, memory local to another processor or memory shared between processors. NUMA attempts to address the problem of processors starved for data due to waiting on memory accesses to complete. NUMA provides for separate memory allocations for each processor (or group of processors) in a multiprocessor system, thereby avoiding the performance degradation when several processors attempt to address the same memory. Each grouping of the processors and their associated connected memory is known as a NUMA node. A set of CPU cores and their associated local memory are referred to as a NUMA "node."

Usually, each CPU core present in the system may have some associated memory local to that CPU core. Local memory for each CPU core means the system topology may introduce complexities, such as non-trivial depth. A "flat" or unstructured system topology may have uniform memory access times, regardless of the CPU core in use. However, it is increasingly difficult to scale flat system architectures to capacities expected in modern systems. A NUMA system usually has multiple memory latency times, reflective of the two or more levels in its system topology. Applications running on NUMA systems which do not use memory local to their CPU cores may experience sub-optimal memory latency when accessing memory data from remote NUMA nodes.

Operating system process schedulers typically optimize for CPU utilization, rather than for CPU core and memory affinity. This means that application jobs are frequently scheduled across various CPU cores on a NUMA system, without sufficient regard for the impact on application memory latency.

Currently, knowledgeable performance experts can manually place and bind application processes to system resources that are best suited for the specific server topology to optimize CPU core and memory affinity, and thus improve the system and application performance. Some users might research and read documentation and performance tuning white papers to learn how to do expert NUMA tuning. Other users might hire consulting performance experts to do custom tuning and application load balancing analysis for their production environments.

DETAILED DESCRIPTION

Figure 1:
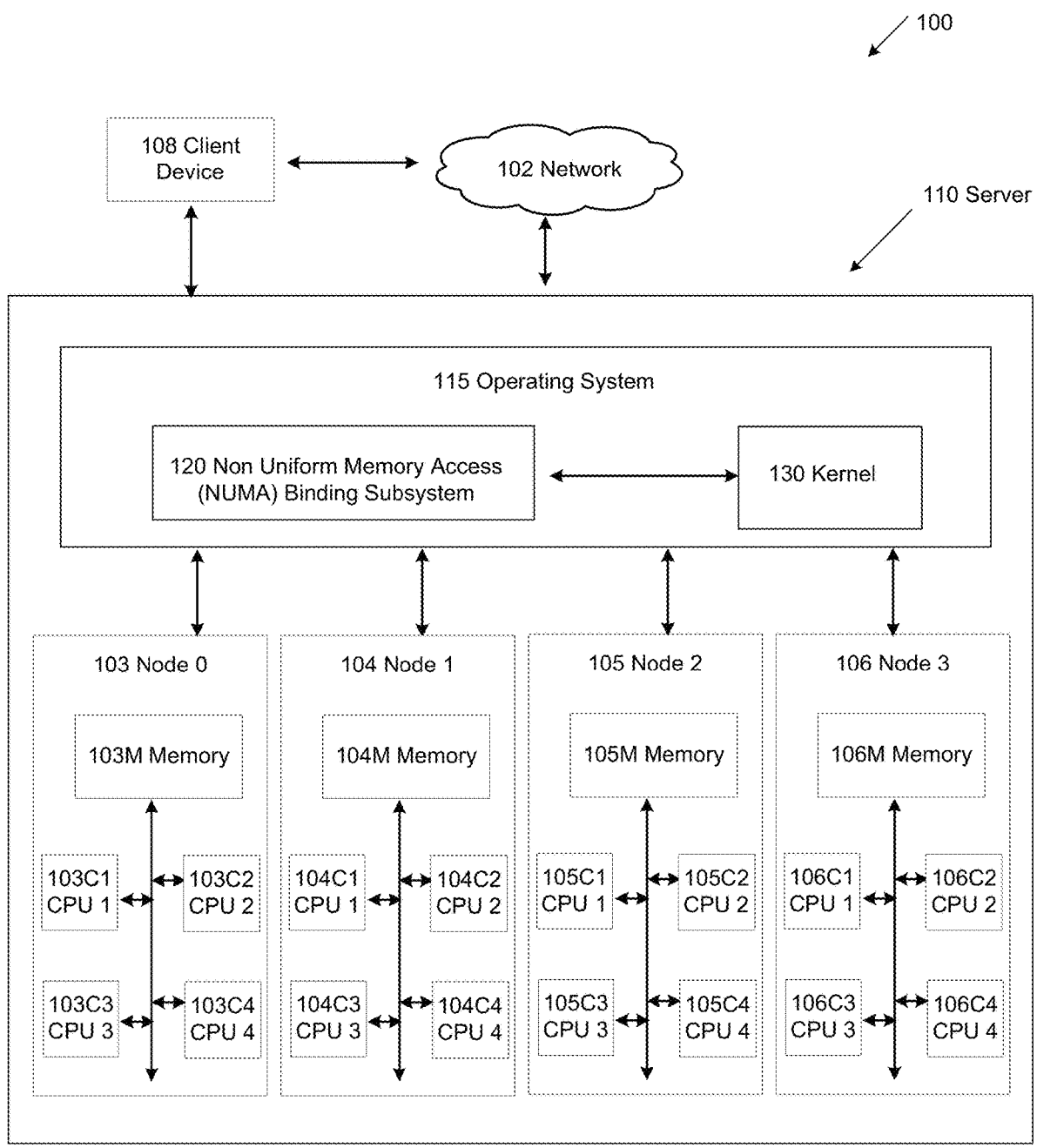
FIG. 1 depicts a block diagram illustrating an example network architecture in which implementations of the present disclosure can operate.

Methods and systems for assigning pre-existing processes to select sets of Non-Uniform Memory Access (NUMA) aligned resources are described. Aspects of the present disclosure provide a NUMA binding subsystem that can be a user-level tool for improving out-of-the-box NUMA system performance for non-expert users. While manual NUMA tuning by performance experts was previously used to achieve good NUMA resource affinity and to accrue optimal performance, the NUMA binding subsystem in accordance with aspects of the present disclosure can provide for assigning new and/or pre-existing or executing processes to NUMA resources and can provide for achieving desirable NUMA affinity and the performance benefits which were previously available only with expert tuning. As used herein, "user-level" means that the NUMA binding subsystem can operate in similar fashion to an application invoked and/or configured by a user and it may use library subroutines and kernel system calls. In an example, the NUMA binding subsystem may be started by a privileged "root" user and thus may have sufficient privileges to manage other processes that may typically be user-level peer applications and processes.

In an example, the NUMA binding subsystem can be a user-level, NUMA affinity management daemon that can monitor NUMA topology and resource usage. In an example, the NUMA binding subsystem can reside in a computer system such as computer system 500 of FIG. 5 as described in further detail below. The NUMA binding subsystem can place significant processes with optimum NUMA locality, dynamically adjusting to changing system conditions. The NUMA binding subsystem also can provide an interface to receive user requests to get assistance with initial binding of CPU cores and memory resources for their processes. The NUMA binding subsystem can improve performance for a long running, significant resource consuming process on the host in a computer system—this may include virtual machines (VMs) (e.g., guest operating systems or guest applications), and ordinary native processes such as High Performance Technical Computing applications. Normal startup requirements can be similar as other daemons and system services. The NUMA binding subsystem can maintain a log of its actions (e.g., in the/var/log/numad.log file).

In an example, the NUMA binding subsystem can advise on NUMA placement. The NUMA binding subsystem can provide a general command line interface which can provide shell-level NUMA pre-placement advice to direct initial placement for processes of a specified resource consumption to direct users and programs to bind processes at process start time, e.g., a certain number of CPU cores and a certain amount of memory of RAM. For example, when a command is about to launch an 8-thread, 8 GB process, the user can first get advice from the NUMA binding subsystem on which nodes have sufficient available resources—then the user can request to bind the process to one or more of the recommended nodes. The process binding can be performed, for example, using a utility known as numactl that controls NUMA policy for processes and/or shared memory and can pre-bind an application or a process to recommended nodes. Using the NUMA binding subsystem when launching processes (e.g., processes requiring significant resources) can reduce subsequent resource contention and fragmentation. The NUMA binding subsystem pre-placement guidance can be available regardless of whether or not the NUMA binding subsystem is actively running as a daemon on the system. This interface can consider both the static topology of the system and the dynamic load to provide placement guidance.

In an example, the NUMA binding subsystem can handle process resource requests which are too large to fit in a single NUMA node. Resource requests can be any quantity from 0 to the entire capability of the system. The NUMA binding subsystem can repeatedly assign pre-existing significant processes to select sets of NUMA-aligned resources. The NUMA binding subsystem can track process resource usage and available system capacity (on a per node basis) while maintaining statistics such as available memory and idle CPU cores. The NUMA binding subsystem can periodically scan processes looking for the significant resource consumers (e.g., using metrics based on a combination of number of threads, running average of memory and cpu utilization, specific named processes, etc.) The NUMA binding subsystem can use various binding mechanisms to assign available NUMA-aligned resources. One example binding mechanism is known as cgroup/cpuset, which can assign a set of CPU cores and memory nodes to a process or to a set of tasks. For large processes, the NUMA binding subsystem can refer to an Advanced Configuration and Power Interface System Locality Information Table (ACPI SLIT) distance data (or similar table) to select a low-latency set of multiple nodes with sufficient resources for the consumer. The ACPI SLIT can describe the distances between the CPU cores and the memory controllers, and can give the units of distance between nodes to minimize the inter-node latencies for processes that necessarily span across multiple nodes.

The NUMA binding subsystem can provide a self-tuning interval to manage new or changing resource requirements. The self-tuning interval can be a time period during which the NUMA binding subsystem can receive a resource requirement and allocate resources to fulfill the requirement. In an example, the self-tuning interval can be deactivated when it is not necessary to manage the resource requirements to reduce the NUMA binding subsystem overhead. Also, the NUMA binding subsystem can determine how recently a given process has been evaluated to avoid evaluating the same process too often.

The NUMA binding subsystem can provide for repeated resource allocation requests with a given process which can grow to a tunable target utilization of resources. For example, a process that is being executed by a processing device can require additional resources during the course of the execution. As the required resources change, the target utilization of resources can be changed or tuned to accommodate the additional resources. A number of CPU cores requested can be bounded by the number of threads in the process. A resource margin, which can indicate an amount of available or free resources, can be a parameter that indicates when the amount of consumed resources have reached a certain level such that a preferred or predefined margin of available resources has been reached. The resource margin can be tunable via the use of the target utilization parameter. For example, an increase in the target utilization parameter to accommodate a need for additional resources can result in a change in the resource margin. An over subscription parameter, which can indicate when an amount of requested resources exceeds an amount of available resources, can also be tunable via use of the target utilization parameter. As the target utilization parameter increases and reaches the over subscription threshold, the NUMA binding subsystem can identify additional resources to effectively adjust the over subscription parameter.

The NUMA binding subsystem can be a NUMA affinity binding agent, for nearly any kind of processes. The NUMA binding subsystem can be process agnostic, not exclusively for managing host VM processes, or for most specific kinds of multi-thread scientific applications. It can be used for most long-running processes that consume significant resources.

The NUMA binding subsystem can be specifically designed with a stateless implementation. Administrators can start or stop the daemon at will. Instead of running as a continuous daemon, administrators can also gain performance benefits by running NUMAD for only a brief period to (re)locate/place jobs, and then shut it down. The NUMA binding subsystem can accept information about specific processes it should manage. It can use this inclusion list and exclusion list specific information to avoid scanning all the processes on the system. After processes are placed in desirable locations, the NUMA binding subsystem can be terminated, and leave resources as assigned.

FIG. 1 depicts a block diagram illustrating a network architecture 100 for providing a Non-Uniform Memory Access (NUMA) binding system for assigning processes to select sets of NUMA aligned resources (also referred to herein as "NUMA binding") in which implementations of the present disclosure can operate. The network architecture 100 may include a server 110, network 102, and a client device 108. The server 110 may include operating system 115 (e.g., Linux® OS, Windows® OS, etc.) which may include the NUMA binding subsystem 120, the kernel 130, and node 0 103, node 1 104, node 2 105, node 3 106. Alternatively, the NUMA binding subsystem 120 can be executed on top of the operating system 115 (in user space). The server 110 may be a computer system to run services that serves the needs of users or other computers (e.g., client device 108) via network 102. An example computer system is described in greater detail below in conjunction with FIG. 5.

Each of node 0 103, node 1 104, node 2 105, node 3 106 can be hardware components within the server 110. Each node may include a number of CPU cores and a quantity of memory. As used herein, a CPU core is an independent central processing unit within a multi-core processor. The CPU core may be a virtual processor that can read and execute program instructions. As used herein, memory refers to the physical devices used to store computer programs or data. In the example as shown in FIG. 1, each node can include a quantity of memory and a number of CPU cores. For instance, 103 node 0 can include a quantity of memory 103M and CPU cores CPU 1 103C1, CPU 2 103C2, CPU 3 103C3, and CPU 4 103C4. Some architectures may be such that each node includes a quantity of memory and more than 4 CPU cores (e.g., each node may include more than 16 CPU cores).

The client device 108 may be any device capable of communicating with the server 110 including, but not limited to, a computer, a smart phone, a wireless device, a tablet, and/or any suitable computing device. In an example, the client device 108 may be a mobile device (e.g., a handheld device, smart phone or web portal device) that communicates with the network 102 via a wireless connection. The client device 108 may also be communicably coupled to the server 110 via the network 102. The client device 108 may also be communicably coupled directly to the server 110. The client device 108 can be operated by a system administrator and can present a user interface for configuring and/or managing the NUMA binding subsystem 120.

The network 102 may be any type of communications medium that allows for the client device 108 to communicate with the server 110. The network 102 may be, for example, a private network (e.g., a local area network (LAN), a wide area network (WAN), intranet, etc.), a corporate network (e.g., a private network for an organization such as a corporation), and/or a public network (e.g., the Internet).

The NUMA binding subsystem 120 may access or request information from system directories managed by the operating system 115. The NUMA binding subsystem 120 can use system calls or interfaces to request information from system directories (e.g., as Linux®/proc and /sys). The /proc file system can be used as an interface to kernel data structures and may describe control groups to which the process or task belongs. The /sys file system can provide information about the kernel status to the user space, for example, the loaded processes in the kernel. In an example, the NUMA binding subsystem 120 may be implemented in the kernel 130. The NUMA binding subsystem 120 may also be implemented in user space or a combination of user space and the kernel 130.

In some implementations, server 110 may host one or more virtual machines (VMs) running on top of the host operating system 115. Each VM may have a guest operating system and one or more guest applications running on top of the guest operating system. The host operating system 115 may represent a hypervisor or include a hypervisor to monitor the operation of the VMs on the host server 110. In such implementations, the NUMA binding subsystem 120 can be part of the hypervisor or run on top of the hypervisor and can obtain information on resource requirements of guest operating systems and/or guest applications using the hypervisor. In addition, the system 100 may include a virtualization platform manager that manages VMs running on multiple host servers 110. The virtualization platform manager can reside on the same machine as host sever 110 or on a different machine and can communicate with the NUMA binding subsystem 120 to request recommendations on how to bind VMs (and/or guest operating systems and/or guest applications) to NUMA nodes, as will be discussed in more detail below in conjunction with FIG. 2B.

Figure 2A:
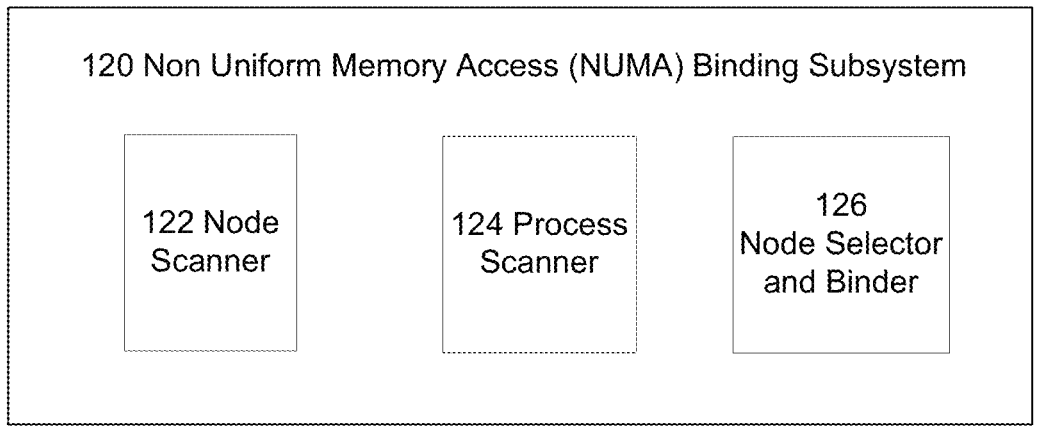
FIG. 2A depicts a block diagram of an example NUMA binding subsystem in accordance with some implementations of the present disclosure.

FIG. 2A depicts a block diagram of an example for providing a NUMA binding subsystem for NUMA binding in accordance with some implementations of the present disclosure. The NUMA binding subsystem 120 may include a node scanner 122, a process scanner 124, and a node selector and binder 126.

The node scanner 122 may be responsible for tracking and recording the available CPU cores and the free memory for each node within the system. A CPU core is an independent central processing unit within a multi-core processor. In an example, the node scanner 122 may query each node within the network architecture 100 (e.g., node 0 103, node 1 104, node 2 105, and node 3 106) regarding the status of its resources. Each respective node may respond to the query by sending a report to the node scanner 122 indicating a measure of resources that are available on the respective node. For example, each report may indicate a number of available CPU cores and an amount of available memory on the respective node. The term "report" as used herein can refer to information provided in any form (e.g., as a message, as data recorded to a log file or any other data store, etc.).

The process scanner 124 may be responsible for tracking and recording information that may be pertinent to each process within the system. For example, for each process on the system, the process scanner 124 may measure the CPU consumption, including the number of CPU cores used and the percentage of CPU usage, measure and calculate prior or lagging maximum CPU usage and memory consumption which can be used to determine if sufficient resources have been allocated to the process, remove specific processes from the system (e.g., in response to a system administrator request or if no CPU consumption has been detected for a predefined time interval), add specific processes to the system (e.g., in response to a system administrator request and/or when resources become available), filter out certain processes when a consumption threshold is met, and add remaining processes to a candidate list. A consumption threshold is a parameter that can indicate a certain amount of resources that is being consumed by a process. As used herein, a candidate list is a list of processes that are subject to initial or modified NUMA node placement (e.g., memory and/or CPU cores). A process may be subject to a modified NUMA node placement if it potentially requires additional resources (e.g., if it has reached or is about to reach maximum resource utilization target), or it actually requires additional resources (e.g., if it has requested additional resources), or it is monitored as part of workload balancing and/or resource assignment re-evaluation.

The node selector and binder 126 may be responsible for selecting a node for the process and for binding that process to the selected node. For example, the node selector and binder 126 can create an ordered list of candidate processes, e.g., a candidate list. Each candidate process can have a unique process ID to distinguish and identify each process from one another. The node selector and binder 126 can denote the number of CPU cores used and the amount of memory consumed (or expected to be consumed) by each process ID. In an example, the node selector and binder 126 can explicitly overestimate the required process resources via utilization target to maintain a specified margin for NUMA resources. Such estimates for future process resource consumption can be determined by the following example equation:

resource request=usage*100/target utilization percent

For the above equation, the usage may be the current usage of an existing process or may be the expected usage of a process that is scheduled to be executed, and the target utilization percent is a percentage of the resources that can be appropriated to the process.

For instance, the target utilization percent may default to 85% of resources. Thus, the NUMA binding subsystem 120 can strive to maintain a margin of at least 15% free resources per node. The NUMA binding subsystem 120 can review the memory and CPU usage that is currently used by a process and add a margin buffer as indicated by the target utilization percent. The NUMA binding subsystem 120 can attempt to match a process to a node containing free resources equal to or greater than the amount actually used plus the utilization margin.

In an example, the required number of CPU cores for a process can be limited by the number of threads in the process. For instance, if the process has 6 threads, then the required number of CPU cores for that process can be limited to no more than 6 CPU cores.

In an example, the node selector and binder 126 can calculate a resource magnitude vector by multiplying the amount of memory consumed (or expected to be consumed) times the number of CPU cores used (or expected to be used) by the candidate process. The resource magnitude vector can be used to create the ordered list of candidate processes, for example, the candidate process having the largest magnitude vector can be placed at the top of the ordered list of candidate processes for consideration of resource allocation.

In an example, the node selector and binder 126 can "bin" sort candidate processes by resource consumption in which the candidate processes that requires approximately equivalent amount of resources can be sorted into the same bucket or category (e.g., bin sort the candidate processes so that the candidate processes that require resources within 10% of each other are sorted into the same category). The node selector and binder 126 can also secondary sort the candidate processes based on a binding time stamp such that, for example, older processes can be re-evaluated sooner and can thus be placed higher on the ordered list of candidate processes for consideration, and processes that have been recently bound to a node can be placed lower on the ordered list.

When the ordered list of candidate processes is created, the node selector and binder 126 can select the first process from the ordered list of candidate processes to determine its resource allocation. In an example, the node selector and binder 126 can determine if the selected process was recently moved or bound to the current node or if the selected process uses interleaved memory. If the process was recently moved or bound to the current node, or if the process uses interleaved memory, then the node selector and binder 126 can skip this process and proceed to the next process in the ordered list of candidate processes.

In an example, the node selector and binder 126 can bias the available resource towards nodes already used by the process. In other words, if the candidate process is currently executed on a certain node or nodes and needs additional resources, and one of such nodes has the additional needed resources, then the node selector and binder 126 can bind the candidate process to a node that is currently used by the process.

With respect to on-going workload balancing/resource assignment re-evaluation, the NUMA binding subsystem 120 can periodically track the resource usage of a particular process and determine that the process may increase its resource consumption, and therefore attempt to maintain a maximum specified resource utilization target. When a process is determined to be ready to consume more resources than are immediately available to them, resource assignments can be modified. For example, the node selector and binder 126 can create an ordered list of available resources. The ordered list of available resources can include a node ID and its respective number of available CPU cores and amount of available memory. The ordered list of available resources may be repeatedly updated and the node selector and binder 126 can continually assign resources to the processes that need additional resources in view of the ordered list of available resources. The ordered list of available resources can be sorted by an available resource magnitude vector for a node, which can be calculated by multiplying the amount of available memory times the number of available CPU cores. The ACPI SLIT distance data (or similar table) can be used to determine a candidate node's inter-node distances from the current node used, which can also be factored into the sort.

In view of the ordered list of available resources, the node selector and binder 126 can determine whether 1) to move a process that requires additional resources to a different node, or 2)=not to move the process and assign additional resources from the same node that the process is currently using, or 3) not to move the process and assign resources to the process from a different node that the process is currently using.

In an example, the node selector and binder 126 can determine that the first node in the ordered list of available resources is the "best" node. If the "best" node is the same node that the process is using, then the node selector and binder 126 can determine to not move the process and assign additional resources from the same node that the process is currently using. If the current node that the process is using has enough resources to accommodate the process requirements, and if the "best" node in the ordered list of available resources can accommodate the entire resource needs of the process, then the node selector and binder 126 can determine to move the process from the node that it is currently using to the "best" node. As discussed above, the cgroup/cpusets binding mechanisms can be used to move the process to the selected node. If the ordered list of available resources indicates that the current node that the process is using cannot accommodate the additional needs of the process, and that no other nodes can accommodate the entire resource needs of the process, then the node selector and binder 126 can determine to not move the process and to also assign resources to the process from an additional node (to bind the process to multiple nodes).

Figure 2B:
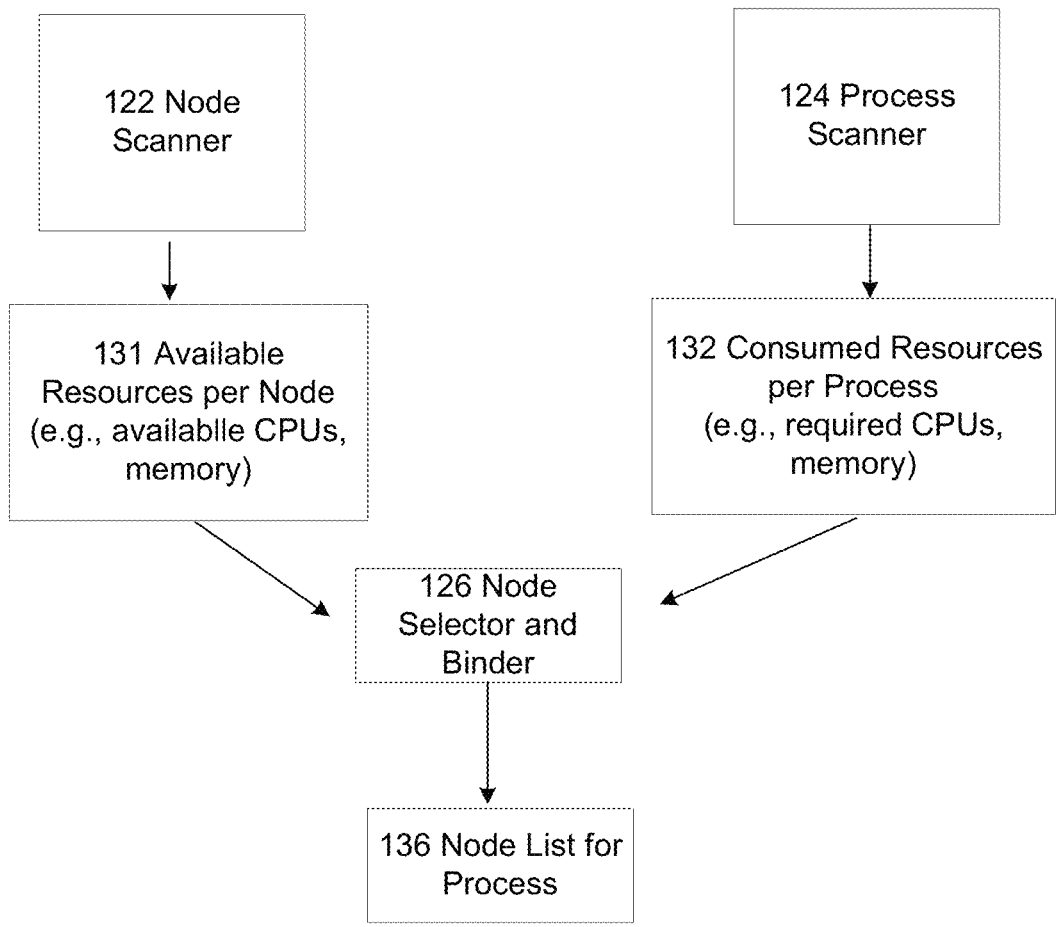
FIG. 2B illustrates an example mechanism for identifying preferred NUMA nodes for processes in accordance with some implementations of the present disclosure.

FIG. 2B illustrates an example mechanism for identifying preferred NUMA nodes for processes in accordance with some implementations of the present disclosure. As discussed above, the node scanner 122 may be responsible for tracking and recording the available CPU cores and the free memory for each node within the system. The node scanner 122 can produce and track the available resources per node 131 based on such tracking and recording of resources.

The process scanner 124 may be responsible for tracking and recording information that may be pertinent to each process within the system. Based on this information, the process scanner can produce and track the consumed resources per process 132.

The node selector and binder 126 can receive as inputs both the available resources per node 131 and the consumed resources per process 132 to produce the node list for process 136. The node list for process 136 can include a list of available NUMA nodes to execute a process or processes.

Figure 2C:
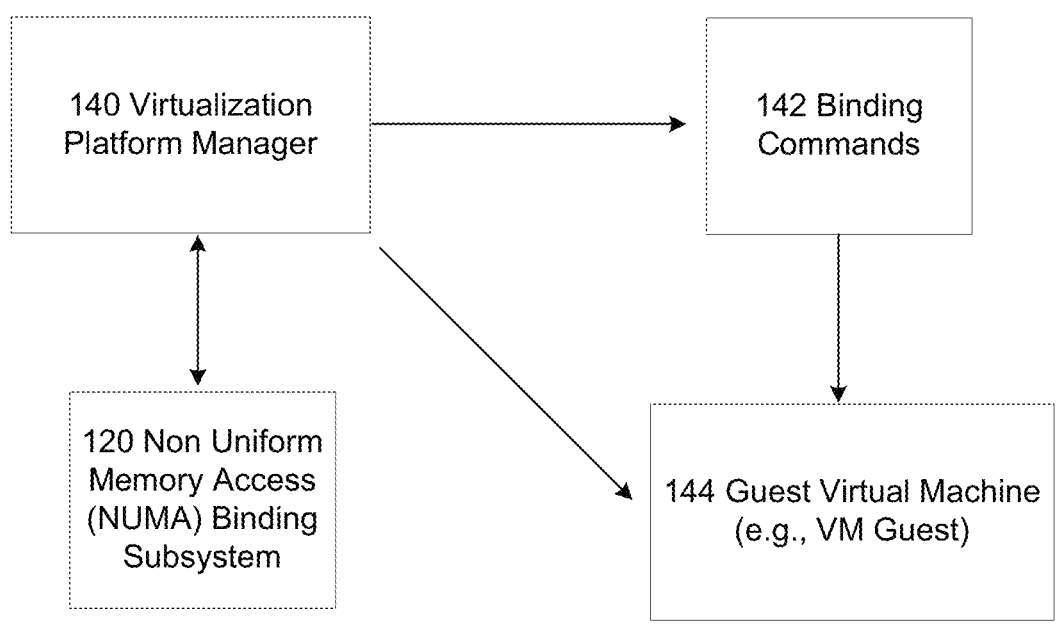
FIG. 2C depicts the operation of an example NUMA binding subsystem in a virtualized environment in accordance with some implementations of the present disclosure.

FIG. 2C depicts a block diagram of an example NUMA binding subsystem in virtualized environment in accordance with some implementations of the present disclosure. For example, as described above, the virtualization platform manager 140 can provide the command line interface to the guest virtual machine 144 to receive requests for NUMA node placement for VMs 114 via commands 142 or receive requests for NUMA node placement directly from the VMs 144. The virtualization platform manager 140 can then communicate with the NUMA binding subsystem 120 to request recommendations on preferred NUMA nodes for VMs 144. Upon receiving the requested recommendations the virtualization platform manager 140 can facilitate binding of recommended NUMA nodes to VMs 144 via binding commands 142 or via direct interactions with VMs 144.

Figure 3:
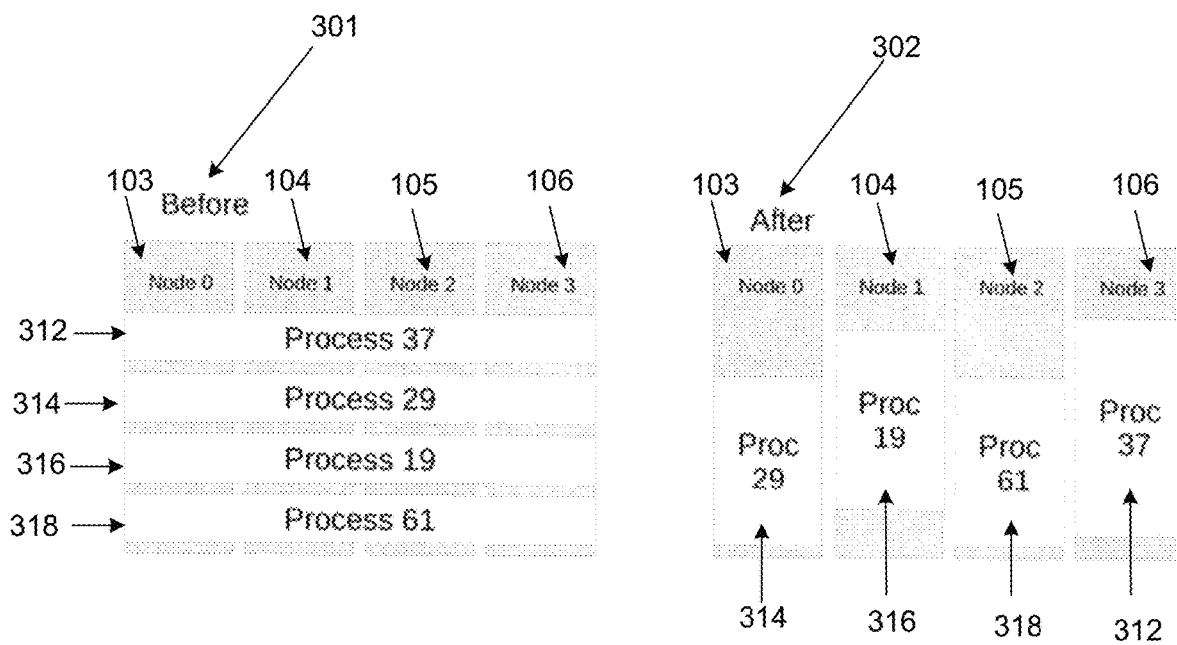
FIG. 3 depicts an example of a NUMA binding subsystem operation in accordance with some implementations of the present disclosure.

FIG. 3 depicts an example 300 for providing a NUMA binding subsystem for NUMA binding in accordance with some implementations of the present disclosure. For example, FIG. 3 depicts a "before" 301 system and an "after" 302 system of processes and nodes. The "before" 301 example system includes node 0 103, node 1 104, node 2 105, and node 3 106 in which each of process37 312, process29 314, process19 316, and process61 318 are fragmented into four sections such that each process is executing on each node in the system. Such fragmentation may cause each process to have sub-optimal memory latency when accessing memory data from remote nodes.

The "after" 302 example system of FIG. 3 illustrates an example result of the NUMA binding subsystem 120. In this example, the entire process is bound to a single node. For instance, process 29 314 is bound to node 0 103, process 19 316 is bound to node 1 104, and so on. Accordingly, the processes may experience improved memory latency when accessing memory data as compared to the "before" 301 example system.

Figure 4A:
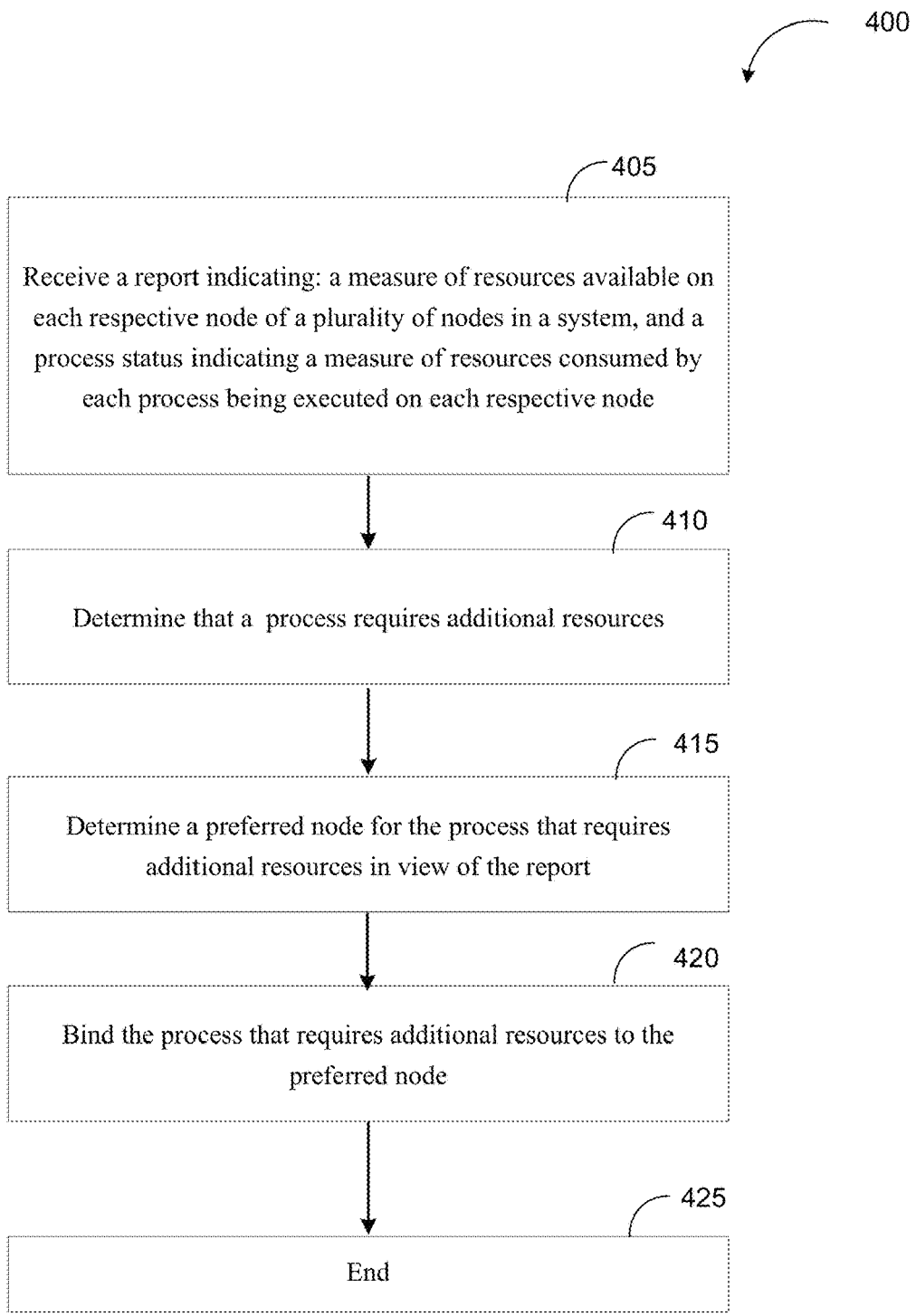
FIG. 4A shows a flow diagram illustrating an example of a method for providing NUMA binding in accordance with some implementations of the present disclosure.

FIG. 4A is a flow diagram of a method 400 of providing a NUMA daemon for NUMA binding according to certain examples. The method 400 may be performed by processing logic that may include hardware (e.g., circuitry, dedicated logic, programmable logic, microcode, etc.), software (e.g., instructions run on a processing device to perform hardware simulation), or a combination thereof. In one example, the method 400 may be performed by the NUMA binding subsystem 120 of FIG. 1.

Referring to FIG. 4A, the method 400 begins at block 405, where the NUMA binding subsystem 120 may receive a report indicating a measure of resources available on each respective node of a plurality of nodes in a system, and a process status indicating a measure of resources consumed by each process executing on each respective node. At block 410, the NUMA binding subsystem 120 can determine that a process requires additional resources. For example, when a process requires additional memory, the process can submit a system call to request the additional memory. Alternatively, when a process is consistently executing at maximum CPU utilization, the NUMA binding subsystem can determine that the process requires additional allocation of CPU.

At block 415, the NUMA binding subsystem 120 can determine a preferred node for the process that requires additional resources in view of the report. At block 420, the NUMA binding subsystem 120 can bind the process that requires additional resources to the preferred node, and the method ends at block 425.

Figure 4B:
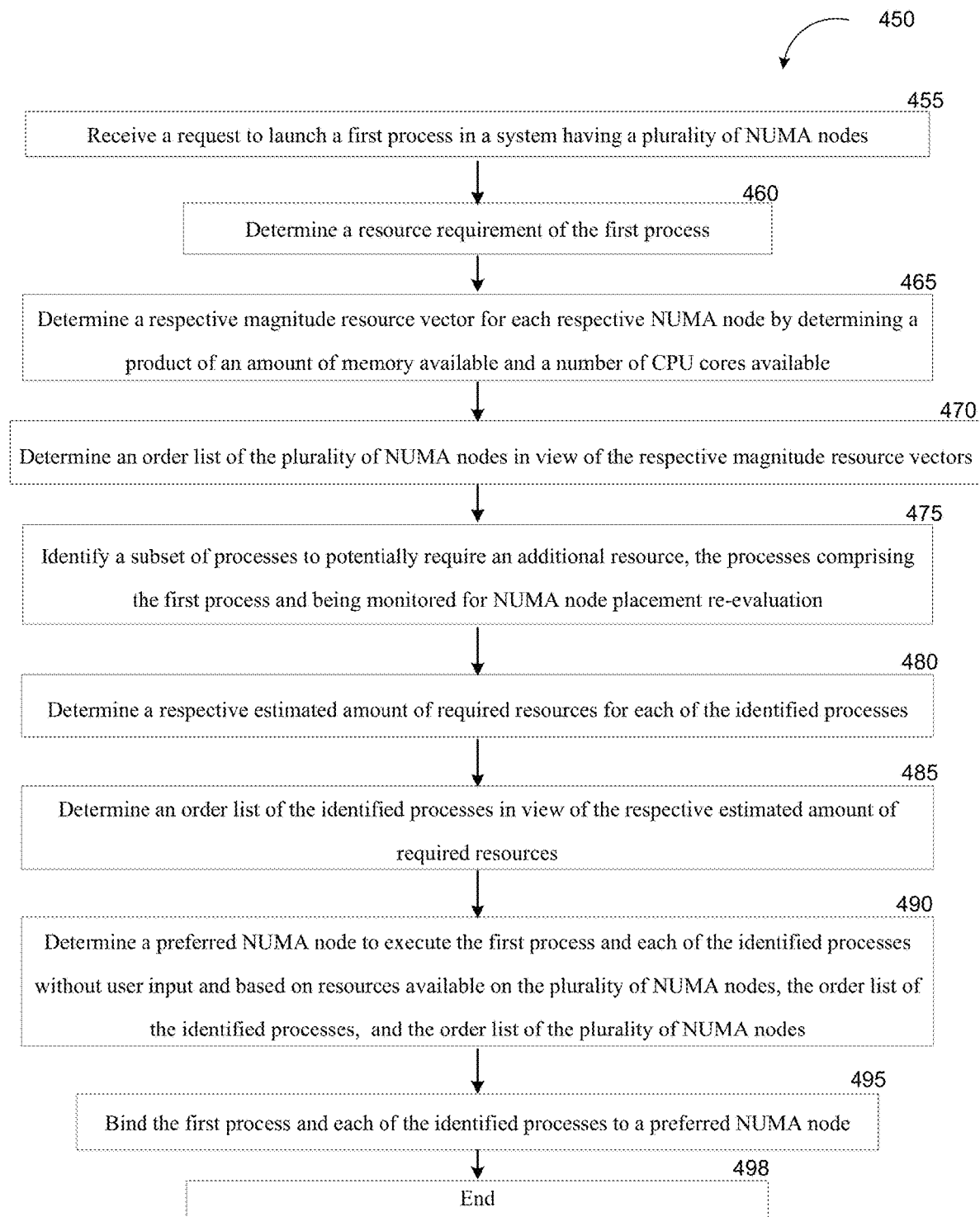
FIG. 4B shows a flow diagram illustrating an example of a method for providing NUMA binding in accordance with some implementations of the present disclosure.

FIG. 4B shows a flow diagram illustrating an example of a method 450 for providing NUMA binding in accordance with some implementations of the present disclosure. The method 450 may be performed by processing logic that may include hardware (e.g., circuitry, dedicated logic, programmable logic, microcode, etc.), software (e.g., instructions run on a processing device to perform hardware simulation), or a combination thereof. In one example, the method 450 may be performed by the NUMA binding subsystem 120 of FIG. 1.

Referring to FIG. 4B, the method 450 begins at block 455, where the NUMA binding subsystem 120 may receive a request to launch a first process in a system having a plurality of NUMA nodes. At block 460, the NUMA binding subsystem 120 can determine a resource requirement of the first process. At block 465, the NUMA binding subsystem 120 can determine a respective magnitude resource vector for each respective NUMA node by determining a product of an amount of memory available and a number of CPU cores available. The magnitude vector can be calculated by multiplying the amount of memory expected to be consumed times the number of CPU cores expected to be used by the first process.

At block 470, the NUMA binding subsystem 120 can determine an order list of the plurality of NUMA nodes in view of the respective magnitude resource vectors. At block 475, the NUMA binding subsystem 120 can identify a subset of processes to potentially require an additional resource, the processes comprising the first process and being monitored for NUMA node placement re-evaluation. At block 480, the NUMA binding subsystem 120 can determine a respective estimated amount of required resources for each of the identified processes.

At block 485, the NUMA binding subsystem 120 can determine an order list of the identified processes in view of the respective estimated amount of required resources. At block 490, the NUMA binding subsystem 120 can determine a preferred NUMA node to execute the first process and each of the identified processes without user input and based on resources available on the plurality of NUMA nodes, the order list of the identified processes, and the order list of the plurality of NUMA nodes. At block 495, the NUMA binding subsystem 120 can bind the first process and each of the identified processes to a preferred NUMA node. At block 498, the method 450 ends.

Figure 5:
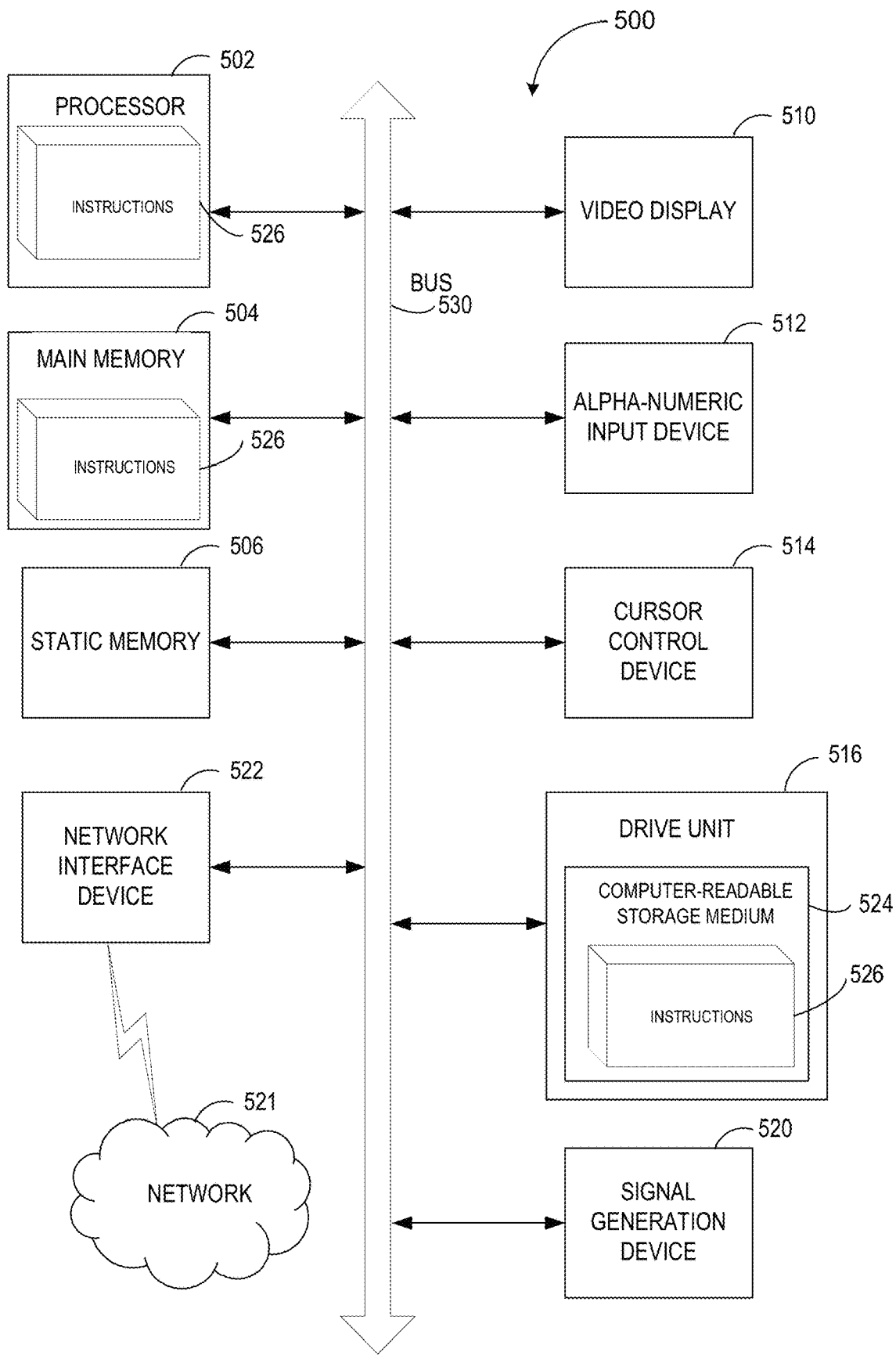
FIG. 5 shows a diagrammatic representation of a machine in the form of a computer system, in accordance with one example.

FIG. 5 depicts a diagrammatic representation of a machine in the form of a computer system 500 within which a set of memory instructions 526, for causing the machine to perform any one or more of the methodologies or operations discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 500 includes a processor 502 (e.g., a processing device), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory 516 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the operations for the NUMA binding subsystem 120 for performing steps discussed herein.

The computer system 500 may further include a network interface device 522. The network interface device may be in communication with a network 521. The computer system 500 also may include a video display unit 510 (e.g., a liquid crystal display (LCD), a touch screen, or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a computer-readable storage medium (or more specifically a non-transitory computer-readable storage medium) 524 on which is stored one or more sets of instructions 526 (e.g., instructions executed by the NUMA binding subsystem 120) for the network architecture 100 representing any one or more of the methodologies or functions described herein. The instructions 526 for the network architecture 100 may also reside, completely or at least partially, within the main memory 504 and/or within the processor 502 during execution thereof by the computer system 500, the main memory 504 and the processing device 502 also constituting computer-readable storage media. The instructions 526 for the network architecture 100 may further be transmitted or received over a network via the network interface device 522.

While the computer-readable storage medium 524 is shown in an example to be a single medium, the term "computer-readable storage medium" should be taken to include a single medium or multiple media (e.g., a centralized or distributed database, and/or associated caches and servers) that store the one or more sets of instructions 526. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
receiving, by a processing device, a request to launch a first process in a system having a plurality of Non-Uniform Memory Access (NUMA) nodes;
determining, by the processing device, a resource requirement of the first process;
determining a respective magnitude resource vector for each respective NUMA node of the plurality of NUMA nodes by determining a product of an amount of memory available and a number of CPU cores available;
determining an order list of the plurality of NUMA nodes in view of the respective magnitude resource vectors;
determining, in view of the order list of the plurality of NUMA nodes and resources available on the plurality of NUMA nodes, a preferred NUMA node of the plurality of NUMA nodes to execute the first process, the preferred NUMA node being determined by the processing device without user input;
binding, by the processing device, the first process to the preferred NUMA node;
identifying a subset of a plurality of processes to potentially require an additional resource, the plurality of processes comprising the first process and being monitored for NUMA node placement re-evaluation;
determining a respective estimated amount of required resources for each of the identified processes, wherein the respective estimated amount of required resources for each of the identified processes is determined by dividing a number of CPU cores consumed by a percent target utilization, and by dividing an amount of memory consumed by the percent target utilization;
determining an order list of the identified processes in view of the respective estimated amount of required resources; and
determining a preferred NUMA node for the each of the identified processes in view of the order list of the identified processes.

2. The method of claim 1, wherein the resource requirement of the first process comprises a target utilization rate, further comprising determining the preferred NUMA node in view of the target utilization rate.

3. The method of claim 1, further comprising providing, by the processing device, a command line interface to bind the first process to the preferred NUMA node.

4. The method of claim 1 further comprising providing a user interface to receive user input identifying the plurality of processes to be monitored for the NUMA node placement re-evaluation.

5. An apparatus comprising:
a memory; and
a processing device communicably coupled to the memory, the processing device to:
receive a request to launch a first process in a system having a plurality of Non-Uniform Memory Access (NUMA) nodes,
determine a resource requirement of the first process,
determine a respective magnitude resource vector for each respective NUMA node of the plurality of NUMA nodes by determining a product of an amount of memory available and a number of CPU cores available;
determine an order list of the plurality of NUMA nodes in view of the respective magnitude resource vectors;
determine in view of the order list of the plurality of NUMA nodes and resources available on the plurality of NUMA nodes, a preferred NUMA node of the plurality of NUMA nodes to execute the first process, the preferred NUMA node being determined by the processing device without user input;
bind the first process to the preferred NUMA node;
identify a subset of a plurality of processes to potentially require an additional resource, the plurality of processes comprising the first process and being monitored for NUMA node placement re-evaluation;
determine a respective estimated amount of required resources for each of the identified processes, wherein the respective estimated amount of required resources for each of the identified processes is determined by dividing a number of CPU cores consumed by a percent target utilization, and by dividing an amount of memory consumed by the percent target utilization;
determine an order list of the identified processes in view of the respective estimated amount of required resources; and
determine a preferred NUMA node for the each of the identified processes in view of the order list of the identified processes.

6. The apparatus of claim 5, wherein the resource requirement of the first process comprises a target utilization rate, further comprising determine the preferred NUMA node in view of the target utilization rate.

7. The apparatus of claim 5, further comprising provide a command line interface to bind the first process to the preferred NUMA node.

8. The apparatus of claim 5, further comprising provide a user interface to receive user input identifying the plurality of processes to be monitored for the NUMA node placement re-evaluation.

9. A non-transitory computer readable storage medium including instructions that, when executed by a processing device, cause the processing device to execute operations comprising:
receiving, by the processing device, a request to launch a first process in a system having a plurality of Non-Uniform Memory Access (NUMA) nodes;
determining, by the processing device, a resource requirement of the first process;
determining a respective magnitude resource vector for each respective NUMA node of the plurality of NUMA nodes by determining a product of an amount of memory available and a number of CPU cores available;
determining an order list of the plurality of NUMA nodes in view of the respective magnitude resource vectors;
determining, in view of the order list of the plurality of NUMA nodes and resources available on the plurality of NUMA nodes, a preferred NUMA node of the plurality of NUMA nodes to execute the first process, the preferred NUMA node being determined by the processing device without user input;
identifying a subset of a plurality of processes to potentially require an additional resource, the plurality of processes comprising the first process and being monitored for NUMA node placement re-evaluation;
determining a respective estimated amount of required resources for each of the identified processes, wherein the respective estimated amount of required resources for each of the identified processes is determined by dividing a number of CPU cores consumed by a percent target utilization, and by dividing an amount of memory consumed by the percent target utilization;

determining an order list of the identified processes in view of the respective estimated amount of required resources;

determining a preferred NUMA node for the each of the identified processes in view of the order list of the identified processes; and binding, by the processing device, the first process and each of the identified processes to the preferred NUMA node.

10. The non-transitory computer readable storage medium of claim 9, wherein the resource requirement of the first process comprises a target utilization rate, further comprising determining the preferred NUMA node in view of the target utilization rate.

11. The non-transitory computer readable storage medium of claim 9, wherein the operations further comprises:

providing, by the processing device, a command line interface to bind the first process to the preferred NUMA node.

* * * * *